(12) United States Patent
Kaneko et al.

(10) Patent No.: US 7,800,802 B2
(45) Date of Patent: Sep. 21, 2010

(54) HOLOGRAM RECORDING MEDIUM AND METHOD FOR MANUFACTURING SAME

(75) Inventors: Yawara Kaneko, Chigasaki (JP); Hideyoshi Horimai, Yokohama (JP)

(73) Assignee: Optware Corporation, Kanagawa (JP)

( * ) Notice: Subject to any disclaimer, the term of this patent is extended or adjusted under 35 U.S.C. 154(b) by 218 days.

(21) Appl. No.: 11/989,818

(22) PCT Filed: Apr. 7, 2005

(86) PCT No.: PCT/JP2005/006845

§ 371 (c)(1), (2), (4) Date: Jan. 31, 2008

(87) PCT Pub. No.: WO03/004942

PCT Pub. Date: Jan. 8, 2003

(65) Prior Publication Data

US 2008/0316555 A1    Dec. 25, 2008

(51) Int. Cl.
*G03H 1/02* (2006.01)
*G03H 1/28* (2006.01)
*G11B 7/00* (2006.01)

(52) U.S. Cl. .................. 359/3; 359/24; 369/109.02
(58) Field of Classification Search .................. 359/3
See application file for complete search history.

(56) References Cited

U.S. PATENT DOCUMENTS 5,856,048 A * 1/1999 Tahara et al. .................. 430/1

FOREIGN PATENT DOCUMENTS

| JP | 6-43810 | 2/1994 |
| JP | 6-247084 | 9/1994 |
| JP | 11-311936 | 11/1999 |
| JP | 2003-4942 | 1/2003 |
| JP | 2004-265472 | 9/2004 |

* cited by examiner

*Primary Examiner*—Stephone B. Allen
*Assistant Examiner*—Jade R Callaway
(74) *Attorney, Agent, or Firm*—H. Henry Koda; William L. Androlia

(57) ABSTRACT

A hologram recording medium including a substrate, a hologram recording layer that records an interference pattern formed by a first wavelength beam, a wavelength selecting reflection layer provided between the substrate and the hologram recording layer that reflects the first wavelength beam and transmits a second wavelength beam, a beam absorbing layer provided between the substrate and the wavelength selecting reflection layer that absorbs the first wavelength beam, and an information layer provided between the substrate and the light absorbing layer in which information is recorded and reproduced by the second wavelength beam, a second information layer provided between the substrate and the information layer and a second wavelength selecting reflection layer provided between the information layer and the second information layer that reflects the second wavelength beam and transmits a third wavelength beam.

5 Claims, 6 Drawing Sheets

Fig.5
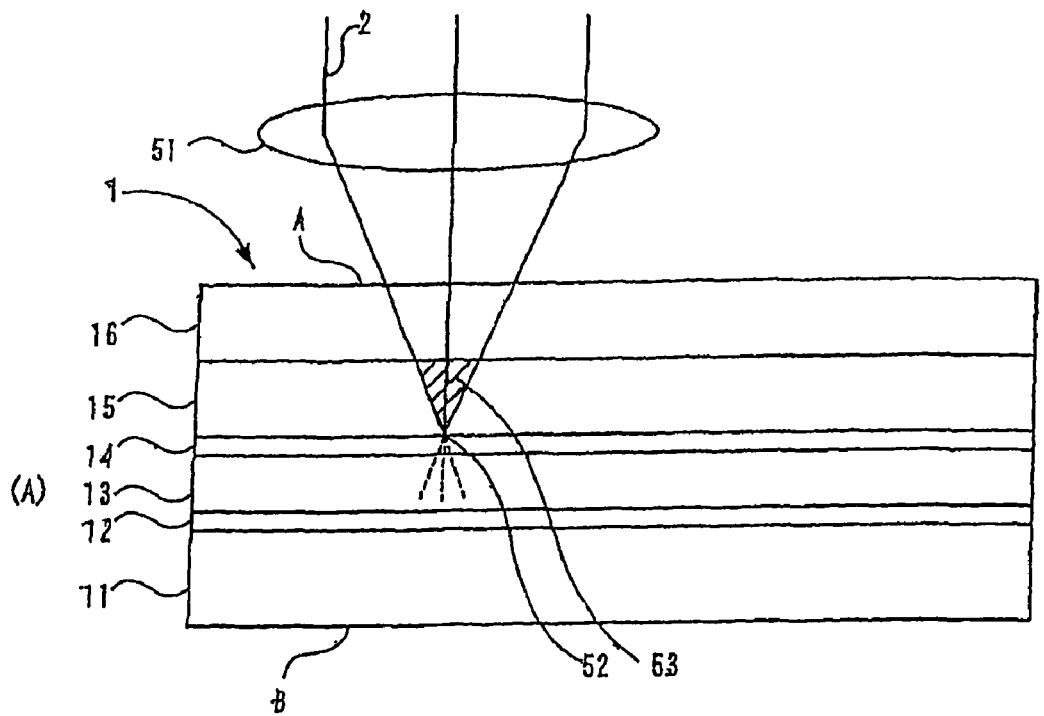
(A)
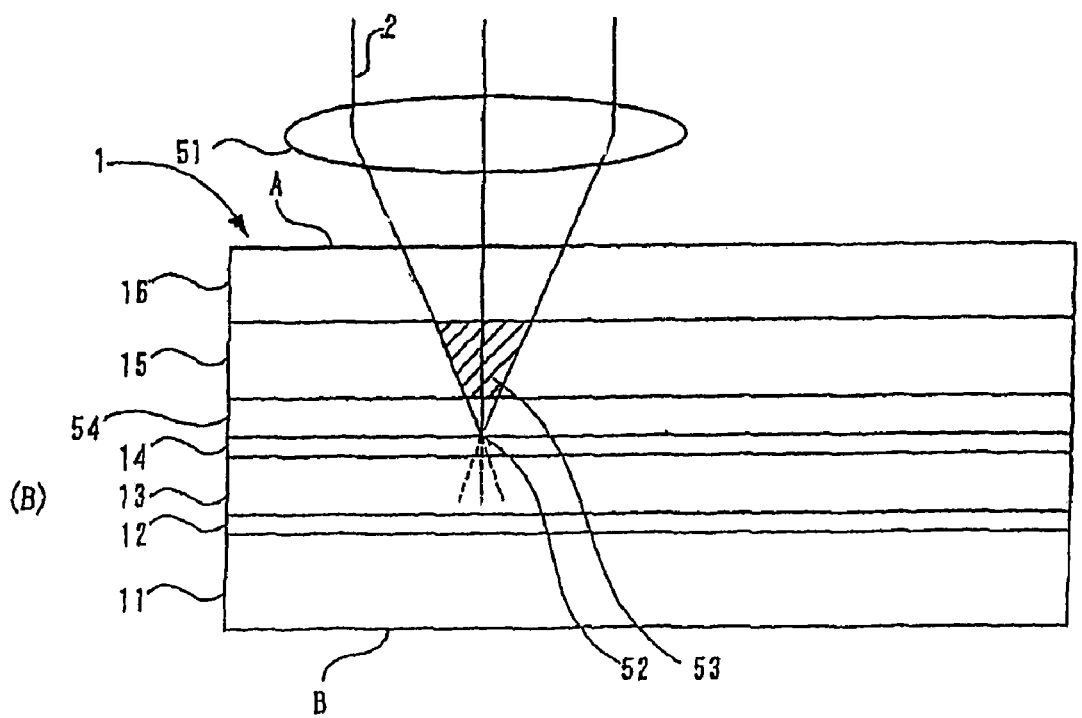
(B)

HOLOGRAM RECORDING MEDIUM AND METHOD FOR MANUFACTURING SAME

TECHNICAL FIELD

The present invention relates to a hologram recording medium and a method for manufacturing the same. In particular, the present invention relates to a hologram recording medium on which a first wavelength beam and a second wavelength beam are irradiated and a method for manufacturing the same.

BACKGROUND ART

Many applications of a holography technology that records an interference pattern of an object wave and a reference wave are proposed and implementation is being discussed. As one application of the holography technology, a holographic memory is proposed. In the holographic memory, light that is an object wave holding image information (referred to, hereinafter, as an "information beam") is used. The information beam and a reference wave (also referred to as a reference beam) are overlapped within a recording medium. An interference pattern formed at this time is written in the recording medium, thereby recording information (Patent Literature 2(.

In the holographic memory, a region of the recording medium at which the information beam and the reference beam are irradiated, namely an address of the information to be recorded, is required to be identified. Therefore, it is proposed that a servo pit used for positioning and identifying the address is provided in the recording medium in advance. However, an unnecessary interference pattern may be recorded in an information recording layer and noise may be generated in a reproduction beam as a result of the information beam and the reference beam being diffused and reflected by the servo pit provided in the recording medium.

Therefore, in Patent Literature 1, a recording medium 101 that includes a filter layer 106 is proposed (FIG. 7). The filter layer 106 changes wavelengths of information beam and reference beam 111 for forming an interference pattern and a wavelength of a servo beam 112 for reading a servo pit. A first wavelength servo beam 112 passes between a transparent substrate 102 and a hologram recording layer 104. Information is recorded in the hologram recording layer 104 by the interference pattern. The filter layer 106 reflects a second wavelength information beam and the reference beam 111. In FIG. 7, servo pits are formed on the substrate 102. The substrate 102 is coated with gold, platinum, or the like. A reflection layer 103 is provided on the substrate 102. A transparent upper substrate 105 is provided on a front surface.

In Patent Literature 1, a combination of a layer formed from cholesteric liquid crystal and a ¼ wavelength plate layer or a dichroic mirror layer is proposed as the filter layer 106. The dichroic mirror layer is formed from a wavelength separating filter on which dielectric multilayer coating (sputtering) is performed.

When the recording medium 101 is used, the servo beam 112 passes through the filter layer 106 and is reflected by the reflection layer 103 on the front surface of the substrate 102. As a result, information in the servo pit can be read. After forming the interference pattern in the hologram recording layer 104, the information beam and the recording reference beam 111 irradiated during recording is reflected by the filter layer 106 without reaching the servo pit on the front surface of the substrate 102. Therefore, recording of unnecessary interference patterns caused by diffusion and reflection in the servo pit can be prevented. A reproduction reference beam 111 irradiated during reproduction is reflected by the filter layer 106 without reading the servo pit on the front surface of the substrate 102. Therefore, generation of noise caused by diffusion and reflection in the servo pit can be prevented.

Patent Literature 1: Japanese Patent Laid-open Publication No. 2004-265472

Patent Literature 2: Japanese Patent Laid-open Publication No. Heisei 11-311936

DISCLOSURE OF INVENTION

Problem to be Solved by the Invention

However, in present state, an intensity of a reproduction beam generated from the hologram recording layer of the hologram recording medium by the reproduction reference beam is merely about 0.001 to 0.0001 compared to an intensity of the reproduction reference beam. If the reproduction reference beam passes through the filter layer 106, the reproduction reference beam is dispersed by the servo pit. Therefore, reliability of the reproduction beam is significantly reduced.

Therefore, the filter layer 106 of Patent Literature 1 is required to sufficiently reduce transmittance of the reproduction reference beam. Transmittance of the filter layer 106 is required to not affect the reproduction beam having the intensity of 0.001 to 0.0001 compared to the reproduction reference beam. An intensity of light not affecting the reproduction beam changes depending on factors, such as performance of a light detector, an error-correcting code (ECC) included in the information in the reproduction beam, and the like. For example, when a design is made with a light having an intensity of 0.01 to 0.001 relative to the intensity of the reproduction beam as an allowable range, the transmittance of the filter layer 106 is required to be less than 0.001. Because the transmittance of the filter layer 106 is 0.001, a light having an intensity that is 0.001 times the reproduction reference beam passes through the filter layer 106, is diffused and reflected by the servo pit, and returns. The returned light passes through the filter layer 106 again. Therefore, as a result of the transmittance of 0.001 of the filter layer 106, the light becomes a light having an intensity that is $(0.001)^2 = 1 \times 10^{-6}$ times the reproduction reference beam. As a result, the intensity ($1 \times 10^{-6}$) of the light that passes through the filter layer 106 and returns is an intensity of 0.01 to 0.001 relative to the intensity of the reproduction beam (about 0.001 to 0.0001 of the reproduction reference beam). The intensity is within the allowable range. Influence on the reproduction beam can be ignored for the most part.

In particular, when the information beam and the reference beam 111 are irradiated onto the recording medium by an object lens, as described in Patent Literature 2, the information beam and the reference beam 111 enter the recording medium as converging light. Therefore, transmittance is required to be reduced for the information beam and the reference beam 111 having various incidence angles. The transmittance is required to be reduced over a wide angle range.

To actualize low transmittance such as that described above, the filter layer 106 is required to be formed as tens of layers to over 100 layers of multilayer film by a vacuum deposition method. Manufacturability of the recording medium deteriorates and manufacturing costs increase. The tens of layers to over 100 layers of multilayer film are all required to be evenly formed over an entire surface of the recording medium. Therefore, a formation method of the multilayer film is limited to the vacuum deposition method.

Because the vacuum deposition method is difficult to apply to a large-scale substrate, a number of substrates to be processed is required to be reduced, and vacuum drawing time is long, the manufacturability deteriorates in these respects as well. Moreover, reliability of recording and reproduction decreases when a failure occurs in even one portion of the multilayer film. Therefore, it is difficult to ensure the reliability of recording and reproduction by all tens of layers to over 100 layers of multilayer film being evenly formed over the entire surface of the recording medium.

The present invention has been achieved in light of the problems above. An object of the present invention is to provide a hologram recording medium in which noise caused by scattering of an information beam and a recording and reproducing reference beam within and outside of an optical information recording medium is reduced and reliability of recording and reproduction is enhanced, and a method of manufacturing the hologram recording medium. Another object of the present invention is to provide a hologram recording medium that can enhance manufacturability, reduce manufacturing costs, and has high mass productivity as a result of relaxing design conditions in manufacturing procedures compared to conventional conditions.

Means for Solving Problem

To achieve the above-described objects, a hologram recording medium of the present invention includes a substrate, a hologram recording layer, a wave selecting reflection layer, a beam absorbing layer, and an information layer. The hologram recording layer records an interference pattern formed by a first wavelength beam. The wave selecting reflection layer is provided between the substrate and the hologram recording layer. The wave selecting reflection layer reflects the first wavelength beam and transmits a second wavelength beam. The beam absorbing layer is provided between the substrate and the wavelength selecting reflection layer. The beam absorbing layer absorbs the first wavelength beam. The information layer is provided between the substrate and the beam absorbing layer. Information is recorded or reproduced in the information layer by the second wavelength beam.

In addition, in the hologram recording medium of the present invention, an absorption rate of the beam absorbing layer for the first wavelength beam is preferably 0.9 or more.

In addition, in the hologram recording medium of the present invention, a reflectance of the wavelength selecting reflection layer for the first wavelength beam is preferably 0.9 or more.

In addition, in the hologram recording medium of the present invention, a gap layer is preferably provided between the hologram recording layer and the wavelength selecting reflection layer.

In addition, in the hologram recording medium of the present invention, a second information layer and a second wavelength selecting reflection layer can be provided. The second information layer is provided between the substrate and the information layer. The second wavelength selecting reflection layer is provided between the information layer and the second information layer. The second wavelength selecting reflection layer reflects the second wavelength beam and transmits a third wavelength beam.

In addition, in the hologram recording medium of the present invention, the information can be recording in the information layer by pits.

In a method of manufacturing the hologram recording medium of the present invention, an information layer is formed on a substrate. A beam absorbing layer that absorbs a first wavelength beam is formed on the information layer. A wavelength selecting reflection layer that reflects the first wavelength beam and transmits a second wavelength beam is formed on the beam absorbing layer. A hologram recording layer that records an interference pattern formed by the first wavelength beam is formed on the wavelength selecting reflection layer.

In addition, in the hologram recording medium of the present invention, the wavelength selecting reflection layer can be formed by a vacuum deposition method.

In addition, in the hologram recording medium of the present invention, the information layer can be formed by concave and convex shapes being formed on a front surface of the substrate.

EFFECT OF THE INVENTION

In the present invention described above, in the hologram recording medium, even when the first wavelength beam passes through the wavelength selecting reflection layer, the first wavelength beam is absorbed by the beam absorbing layer. Therefore, noise caused by scattering in the information layer can be reduced and reliability of recording and reproduction can be enhanced.

Furthermore, in the hologram recording medium of the present invention, even when a portion of the first wavelength beam passes through the wavelength selecting reflection layer, the portion of the first wavelength beam is absorbed by the beam absorbing layer. Therefore, design conditions of the wavelength selecting reflection layer that conventionally requires multiple layers of tens of layers to over a hundred layers can be relaxed, thereby enhancing manufacturability. When the number of layers in the wavelength selecting reflection layer is reduced, manufacturing procedures are reduced. Therefore, manufacturing costs can be reduced.

BRIEF DESCRIPTION OF DRAWINGS

FIGS. 5(A) and (B) are schematic cross-sectional views of a gap layer in the hologram recording medium according to an embodiment of the present invention.

BEST MODE(S) FOR CARRYING OUT THE INVENTION

Figure 1:
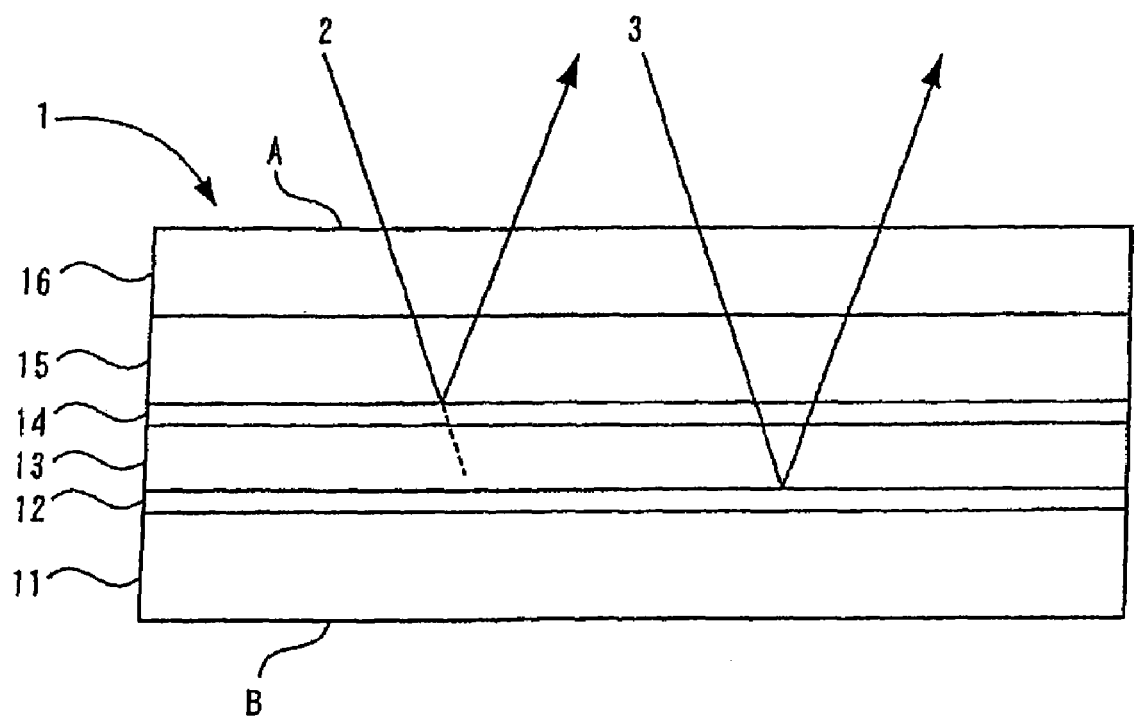
FIG. 1 is a schematic cross-sectional view of a hologram recording medium of the present invention.

Embodiments of the present invention will be described hereafter, with reference to the drawings. FIG. 1 is a schematic cross-sectional view of a hologram recording medium of the present invention.

A hologram recording medium 1 in FIG. 1 includes a substrate 11, a hologram recording layer 15, a wavelength selecting reflection layer 14, a beam absorbing layer 13, and an information layer 12. The hologram recording layer 15 records an interference pattern. The wavelength selecting reflection layer 14 is provided between the substrate 11 and the hologram recording layer 15. The beam absorbing layer 13 is provided between the substrate 11 and the wavelength selecting reflection layer 14. The information layer 12 is provided between the substrate 11 and the beam absorbing layer 13. In the present specification, a surface of the hologram recording medium 1 through which a first wavelength beam 2 and a second wavelength beam 3 enter is referred to as an entrance surface A. An opposite surface of the hologram recording medium 1 is referred to as a back surface B. Moreover, in FIG. 1, a protecting layer 16 is provided on the recording medium 1, on the entrance surface A side of the hologram recording layer 15.

A plastic substrate, such as polycarbonate, a glass substrate, a metal substrate, and the like can be used as the substrate 11. When the plastic substrate is used, pits serving as an information layer, described hereafter, can be easily formed by the surface being formed unevenly through pressing. The glass substrate has high strength and smoothness. Influence from tilting caused by deformation of the substrate and the like can be reduced. The metal substrate can also serve as a reflection layer for the second wavelength beam. A shape of the substrate 11 can be a disk-shape or a card-shape.

A thickness of the substrate 11 is not particularly limited. However, when the overall recording medium 1 is 1.2 to 2.4 millimeters, the recording medium 1 can be compatible with compact discs (CD) and digital versatile discs (DVD) currently in use.

The hologram recording layer 15 records an interference pattern of an object wave and a reference wave. Preferably, the hologram recording layer 15 is formed from a material that is sensitive to the wavelengths of the object wave and the reference wave that are the first wavelength beam 2 and not sensitive to the second wavelength beam 3. For example, a photopolymer material can be used for the hologram recording layer 15. When the photopolymer material is used as the material of the hologram recording layer 15, design is made such that the photopolymer material is sensitive to green and blue beams. Therefore, the first wavelength beam 2 uses the green or blue beams. The second wavelength beam 3 uses beams of other wavelengths, such as red beams. In the present invention, the hologram recording layer 15 is not limited to the photopolymer material.

The hologram recording layer 15 can be formed by a coating method in which the photopolymer material is coated by spin coating or a sandwiching method. In the sandwiching method, a hologram photosensitive material is sandwiched between a substrate on which a bottom layer of the hologram recording layer 15 is formed and a substrate on which a top layer is formed, thereby forming the hologram recording layer 15. When the hologram recording layer 15 is formed through use of the sandwiching method, the hologram recording layer 15 also functions as an adhesive layer between the substrate of the top layer and the substrate of the bottom layer.

As the sandwiching method, there is a method in which a space is provided and fixed between the substrate of the bottom layer and the substrate of the top layer. The material is poured into the space and stabilized (such as hardened). When the space is provided and fixed between the substrates, a periphery of the space can be sealed by a sealing material, and an injection hole and an exhaust opening can be provided. Alternatively, the space can fixed through use of a fixing support.

As another example of the sandwiching method, there is a method in which a desired amount of the material is dripped onto the substrate of the bottom layer. The substrate of the top layer is crimped while remaining parallel with the substrate of the bottom layer, and the substrate of the top layer and the substrate of the bottom layer are laminated. As a result, the material is evenly spread over the entire substrate and stabilized (such as hardened).

The wavelength selecting reflection layer 14 reflects the first wavelength beam 2 and transmits the second wavelength beam 3. A dichroic mirror layer 21 or a cholesteric liquid crystal layer 22 in which a high-refraction material and a low-refraction material are alternately layered can be used as the wavelength selecting reflection layer 14. A reflecting surface of the wavelength selecting reflection layer 14 for the first wavelength beam 2 is preferably flat such that information can be stably recorded and reproduced.

Figure 2:
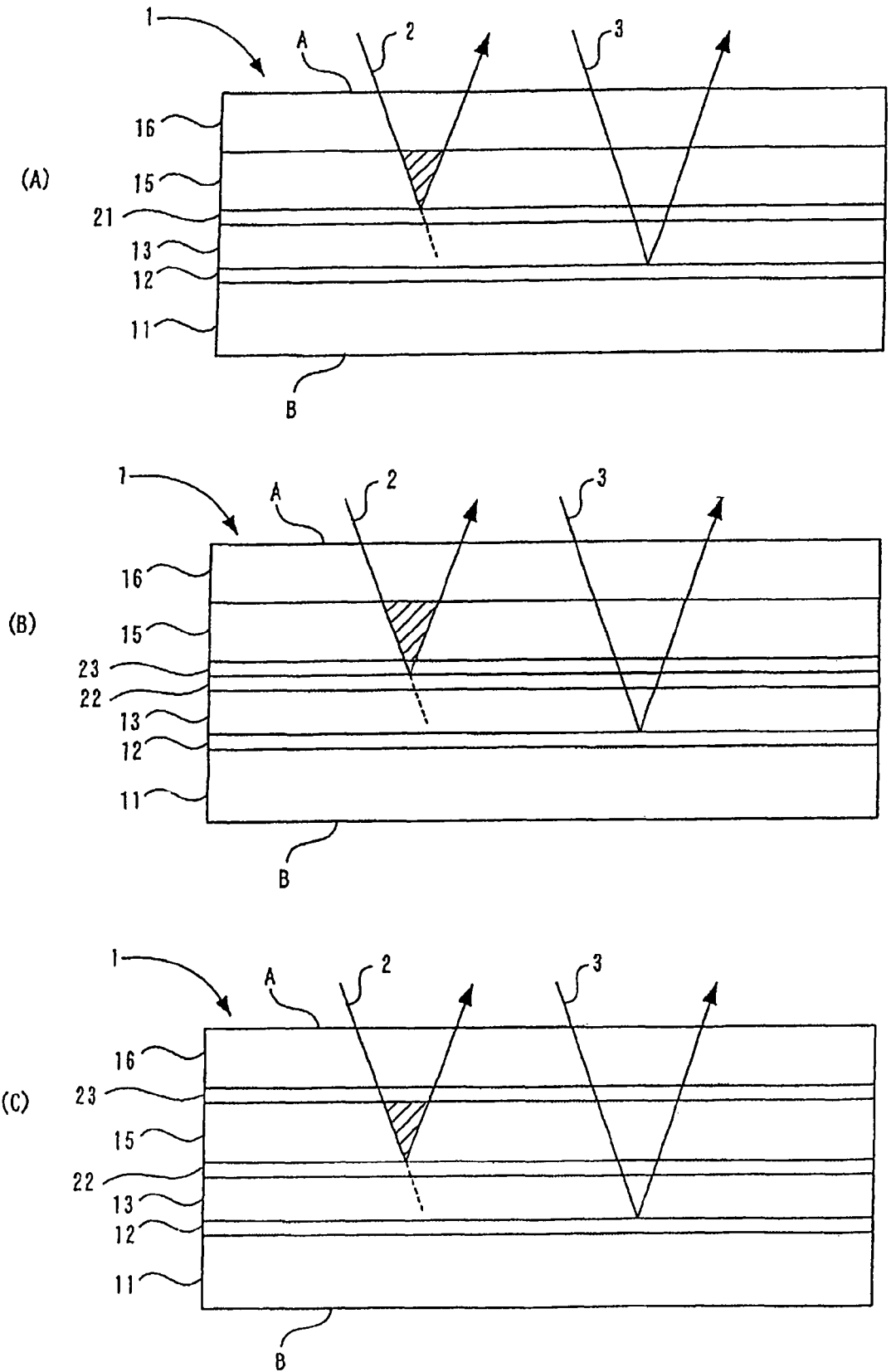
FIG. 2(A) to (C) are each schematic cross-sectional views of a wavelength selecting reflection layer in the hologram recording medium according to an embodiment of the present invention.

FIG. 2(A) is a schematic cross-sectional view of the recording medium 1 when the dichroic mirror layer 21 is used as the wavelength selecting reflection layer 14. A multilayer laminated film formed from polyethylene or nylon and the like can be used as the dichroic mirror layer 21.

In the recording medium 1 of the present invention, conditions regarding the transmittance of the dichroic mirror 21 for the first wavelength beam are more moderate compared to conventional conditions as a result of the beam absorbing layer 13, described hereafter. Therefore, the dichroic mirror 21 can be formed by a method other than the vacuum deposition method. For example, the dichroic mirror 21 is coated with an organic material or the like using a coating method such as spin coating. When the coating method is used, manufacturing costs can be significantly reduced.

Because the conditions regarding transmittance is more moderate, the number of layers in the dichroic mirror layer that is conventionally tens of layers to over a hundred layers can be reduced. For example, when the transmittance is 0.005, about 15 layers are required. When the number of layer in the wavelength selecting reflection layer 14 is reduced, number of procedures decreases. Therefore, manufacturability can be enhanced compared to conventional manufacturability and manufacturing costs can be reduced.

FIGS. 2(B) and (C) are schematic cross-sectional views of when the cholesteric liquid crystal layer 22 is used as the wavelength selecting reflection layer 14. The cholesteric liquid crystal has a characteristic in that a beam of circularly polarized light in a predetermined direction is reflected and other beams are transmitted. Therefore, when the cholesteric liquid crystal layer 22 is used as the wavelength selecting reflection layer 14, the cholesteric liquid crystal layer 22 is used in combination with a ¼ wavelength plate. The first wavelength beam 2 is shifted by ¼ of the wavelength by the ¼ wavelength plate and is the beam of circularly polarized light. The second wavelength beam 3 is a beam of elliptically polarized light rather than the circularly polarized light. Therefore, the cholesteric liquid crystal layer 22 can reflect the first wavelength beam 2 and transmit the second wavelength beam 3. A cholesteric filter manufactured by Rolic Technologies Ltd. and the like can be used as the wavelength selecting reflection layer 14 using the cholesteric liquid crystal layer 22 such as this.

The ¼ wavelength plate can be disposed outside of the recording medium 1 as an optical element. Alternatively, a layer functioning as the ¼ wavelength plate can be disposed in the recording medium 1 such as to be closer to the entrance surface A side than the cholesteric liquid crystal layer.

In FIG. 2(B), the ¼ wavelength plate layer 23 is disposed between the hologram recording layer 15 and the cholesteric liquid crystal layer 22. Therefore, the first wavelength beam 2 forms the interference pattern in the hologram recording layer 15. Then, the first wavelength beam 2 becomes the circularly polarized light in the ¼ wavelength plate layer 23 and is reflected by the cholesteric liquid crystal layer 22. In the recording medium 1 in FIG. 2(B), the ¼ wavelength plate layer 23 can also serve as the gap layer, described hereafter.

In FIG. 2(C), the ¼ wavelength plate layer 23 is disposed between the protecting layer 16 and the hologram recording layer 15. Therefore, the first wavelength beam 2 becomes the circularly polarized light in the ¼ wavelength plate layer 23. Then, the first wavelength beam 2 forms the interference pattern in the hologram recording layer 15 and is reflected by the cholesteric liquid crystal layer 22.

In the hologram recording medium 1 of the present invention, a reflectance of the wavelength selecting reflection layer 14 for the first wavelength beam 2 can be less than 1, and preferably 0.9 or more. During recording, the first wavelength beam 2 is an object wave and a recording reference wave forming the interference pattern in the hologram recording layer 15, positioned closer to the entrance surface A side of the recording medium 1 than the wavelength selecting reflection layer 14. Alternatively, during reproduction, the first wavelength beam 2 is a reproduction reference wave that interferes with the interference pattern recorded in the hologram recording layer 15 and generates a reproduction beam.

An upper limit of the transmittance (a lower limit of the reflectance) of the wavelength selecting reflection layer 14 for the first wavelength beam 2 can be designed based on an absorption rate of the first wavelength beam 2 in the beam absorbing layer 13. In other words, when an intensity of the incident first wavelength beam 2 is $I_0$ and the transmittance of the wavelength selecting reflection layer 14 is $\tau$, an intensity of the first wavelength beam 2 passing through the wavelength selecting reflection layer 14 $I_1$ is $I_0 \times \tau$. When the absorption rate of the first wavelength beam 2 at the beam absorbing layer 13 is $\alpha$, an intensity of a returning beam of the first wavelength beam 2 passing through the wavelength selecting reflection layer 14 is $I_0 \times (1-\alpha)^2 = I_0 \times \tau \times (1-\alpha)^2$. Furthermore, an intensity of a beam $I_3$ passing through the wavelength selecting reflection layer 14 is $I_2 \times \tau = I_0 \times \tau^2 \times (1-\alpha)^2$. Here, the $I_3$ is an intensity at which influence on the reproduction beam can be ignored. For example, when an intensity at which the influence on the reproduction beam can be ignored is $1 \times 10^{-6} \times I_0$, $I_3 < 1 \times 10^{-6} \times I_0$ $I_0 \times \tau^2 \times (1-\alpha)^2 < 1 \times 10^{-6} \times I_0$ $\tau^2 < 1 \times 10^{-6} / (1-\alpha)^2$ $\tau < 1 \times 10^{-3} / (1-\alpha)$.

The upper limit of the transmittance $\tau$ is determined. The above calculation does not take scattering rate into consideration and is that when all transmitted first wavelength beams 2 become returning beams. If the scattering rate is taken into consideration, design rules are further relaxed. In the recording medium 1 of the present invention, even when the design rules of the wavelength selecting reflection layer 14 is not relaxed and the same conditions as the conventional conditions are used, the influence can be reduced even when a portion of the first wavelength beam 2 is transmitted as a result of a failure in the wavelength selecting reflection layer 14, because the beam absorbing layer 13, described hereafter, is present. Thus, reliability can be enhanced.

The wavelength selecting reflection layer 14 transmits the second wavelength beam 3 of a required intensity. The second wavelength beam 3 records and reproduces information in the information layer 12 closer to the back surface B side than the wavelength selecting reflection layer 14. The second wavelength beam 3 can be a beam reproducing the information by reading information recorded in the information layer 12. Alternatively, the second wavelength beam 3 can be a beam that records information by forming a pit on the information layer 12 and reproduces the information from the pit. Alternatively, the second wavelength beam 3 can be a second information beam and a recording reference beam that records information by forming an interference pattern on the information layer 12 or a second reproducing reference beam that reproduces information from the interference pattern recorded on the information layer 12. The intensity required for the second wavelength beam 3 is the intensity required for recording or reproducing in the information layer 12. For example, when the pit is recorded on the information layer 12 as the information, the transmittance of the wavelength selecting reflection layer 14 for the second wavelength beam 3 is a transmittance at which a change in the reflectance or transmittance for the second wavelength beam 3 caused by the pit can be detected.

The beam absorbing layer 13 is formed from a material that absorbs the first wavelength beam 2. A resin filter or the like can be used as the beam absorbing layer 13. When the resin filter is used as the beam absorbing layer 13, the beam absorbing layer 13 is formed using a method for adhering a sheet of resin filter or a coating method such as spin coating.

Even when a portion of the first wavelength beam 2 passes through the wavelength selecting reflection layer 14, because the beam absorbing layer 13 is present, the reading medium 1 of the present invention can reduce the effect. Reliability can be enhanced and the design rules for the wavelength selecting reflection layer 14 can be relaxed.

The absorption rate of the beam absorbing layer 13 for the first wavelength beam 2 is preferably within a range of 0.8 to 1, and more preferably within a range of 0.9 to 1. the beam absorbing layer 13 transmits the second wavelength beam 3 having an intensity that can record or reproduce information in the information layer 12 on the back surface B side.

The information layer 12 is provided closer to the back surface B side than the wavelength selecting reflection layer 14. The information is recorded or reproduced by the second wavelength beam 3. The information layer 12 can be a reproduction-dedicated layer in which the information is recorded in advance or a recording and reproducing layer than can record and reproduce information. The information layer 12 can record address information for servo of the information wave and the reference wave, identifying information of the recording medium indicating capacity, structure, and the like of the recording medium, or information similar to that recorded by the first wavelength beam. The address information for servo is not required when positioning is performed using another method. For example, the address information for servo is not required when a relative position relationship of the recording medium 1 and the first and second wavelength beams 2 and 3 is mechanically controlled by an X-Y stage or the like. In particular, when the information layer 12 is that in which the information is recorded by the pits, if the first wavelength beam reaches the information layer 12, the first wavelength beam is severely scattered. Therefore, preferably, the beam absorbing layer 13 is disposed and absorbs the first wavelength beam.

Figure 3:
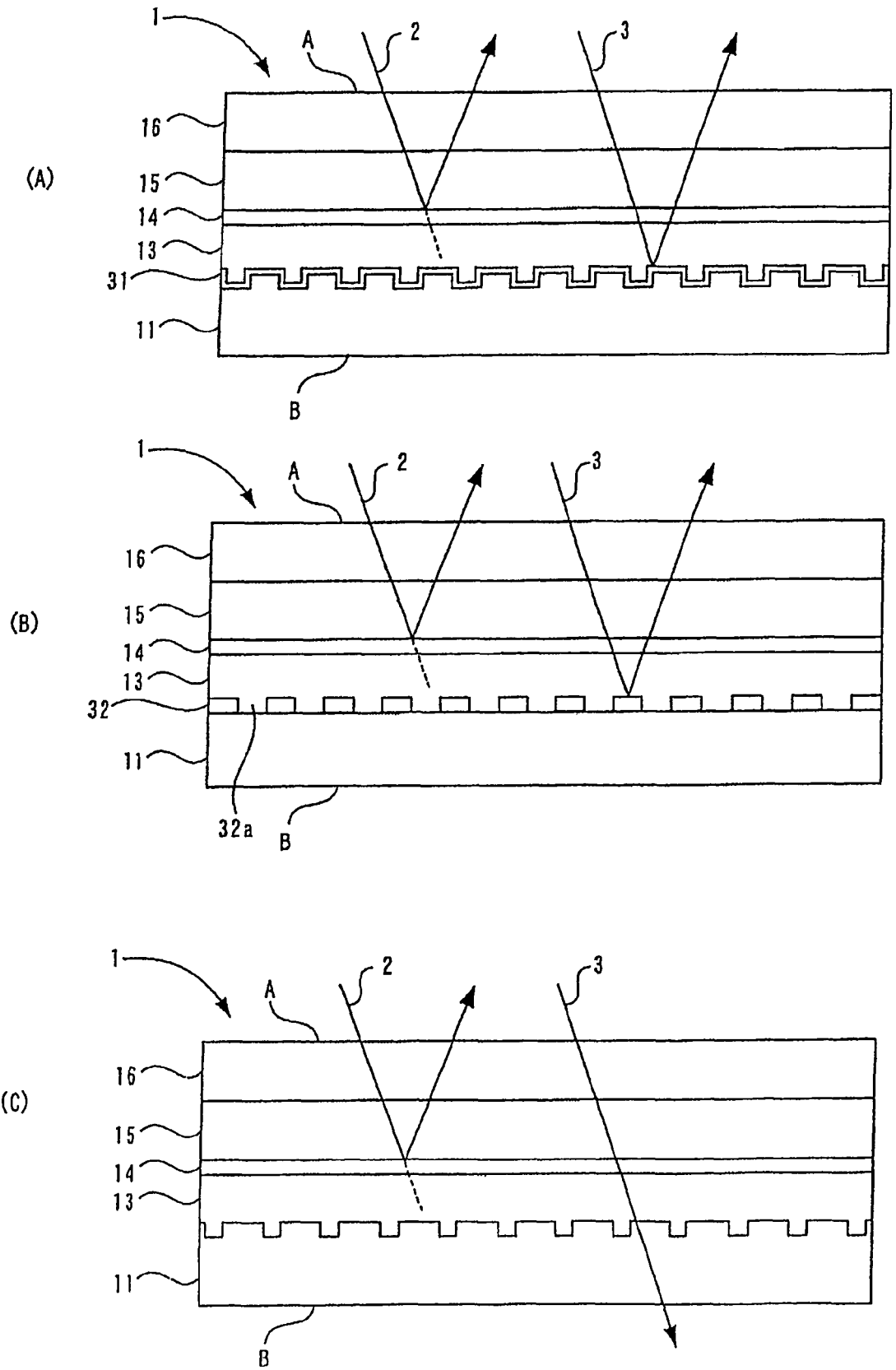
FIG. 3(A) to (C) are each schematic cross-sectional views of an information layer in the hologram recording medium according to an embodiment of the present invention.

FIG. 3(A) to (C) are schematic cross-sectional views of the hologram recording medium 1 when a layer on which pits are formed in advance is used as the reproduction-dedicated information layer 12. As shown in FIG. 3(A) to (C), information can be reproduced by changes in the reflectance or the transmittance of the second wavelength beam 3 caused by the unevenness of the pits. A reflection layer is preferably formed as a part of the information layer 12 when the information is reproduced by the changes in the reflectance or to detect the change in the transmittance on the entrance surface A side. Concave and convex shapes can be formed on the front surface of the substrate 11 and the reflection layer can be formed on the uneven front surface as required, thereby forming the pits. Alternatively, for example, a configuration can be used in which a layer for pit formation is formed on the substrate 11. Concave and convex shapes are formed on the layer by an etching process or the like. The reflection layer is formed on the uneven front surface as required. The address information for servo, the identifying information of the recording medium 1, and the like can be recorded in advance by the pits.

FIG. 3(A) is a schematic cross-sectional view of the hologram recording medium 1 in which a reflective information layer 12 is configured by the front surface of the substrate 11 being formed unevenly and a reflection layer 31 being formed on the uneven front surface. FIG. 3(B) is a schematic cross-sectional view of the hologram recording medium 1 in which the information layer 12 is configured by a metal layer 32 being formed on the substrate 11 and holes 32a being formed by etching through photolithography technology. The information layer 12 including the metal layer 32 and the holes 32a in FIG. 3(B) can be used as the reflective information layer 12 or as the transmissive information layer 12. FIG. 3(C) is a schematic cross-sectional view of the hologram recording medium 1 in which the transmissive information layer 12 is configured by the front surface of the substrate 11 being formed unevenly. In FIG. 3(C), the surface of the substrate 11 functions as the information layer 12.

An organic pigment layer, a phase change layer, a second hologram recording layer, and the like can be used as the recording and reproducing layer. When the information layer is the organic pigment layer, information can be recorded only once. The pits can be formed by pigment being decomposed by a laser beam. The formed pits can reproduce information by changes in the reflectance or the transmittance of the pit, as in the reproduction-dedicated layer.

When the information layer 12 is the phase change layer, the information can be rewritten. Crystal structure of the phase change layer is changed through heating by a laser beam. A crystalline portion and a non-crystalline portion are formed. As a result, the information can be recorded by differences in the reflectance or the transmittance of the crystalline portion and the non-crystalline portion.

Figure 4:
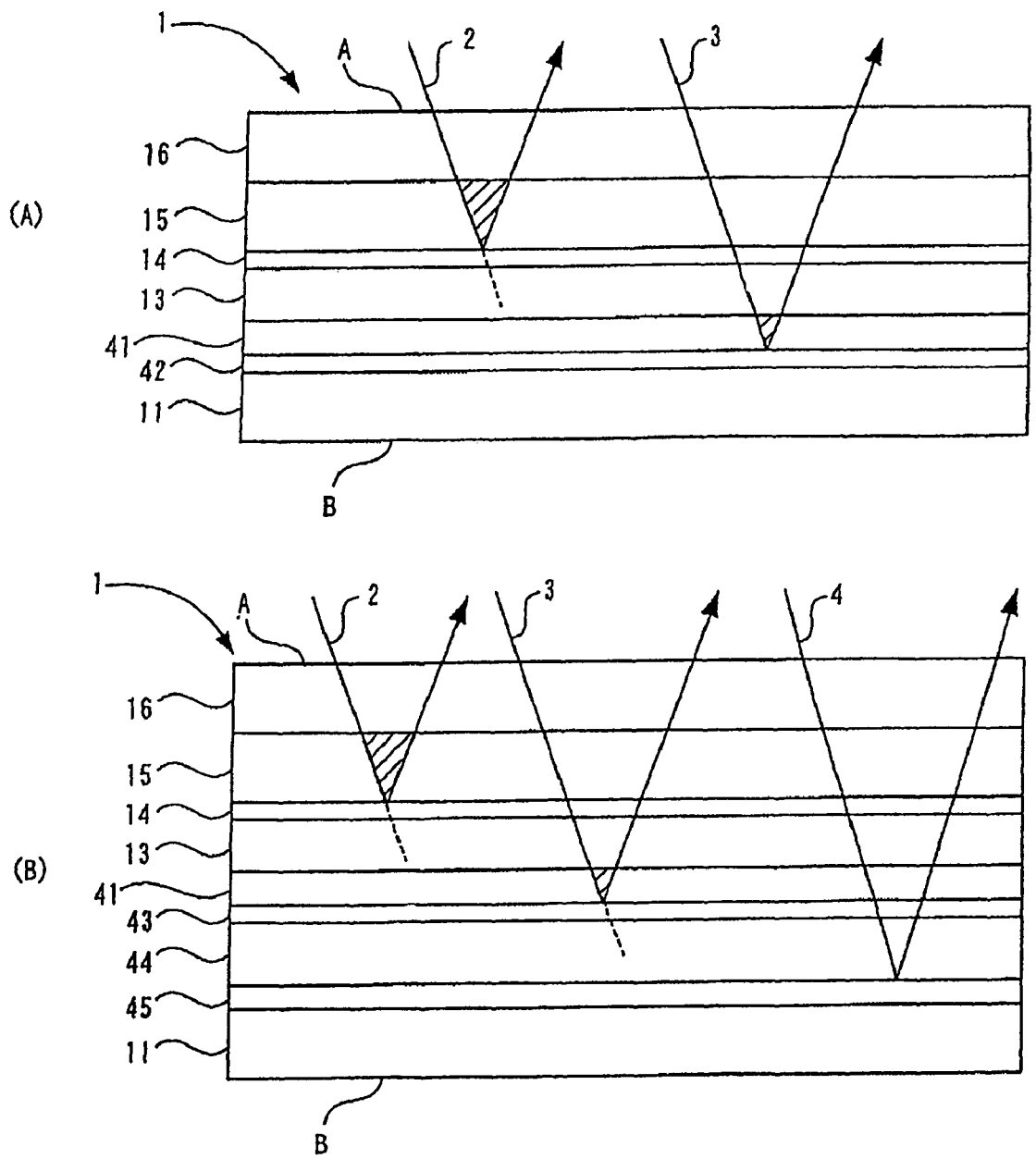
FIGS. 4(A) and (B) are each schematic cross-sectional views of an information layer in the hologram recording medium according to another embodiment of the present invention.

When the information layer 12 is the second hologram recording layer, a material sensitive to the second wavelength beam 3 is used. An interference pattern formed by the second information beam and the recording reference beam of the second wavelength beam 3 is formed. The information is reproduced by the reproducing reference beam of the second wavelength beam 3. In this case, the configuration can be that in which a reflection layer for reflecting the second wavelength beam 3 is further formed closer to the back surface B side than the second hologram recording layer and the reproduction beam is detected on the entrance surface A side. FIG. 4(A) is a schematic cross-sectional view of the hologram recording medium 1 including a second hologram recording layer 41 as the information layer 12 and further including a reflection layer 42 on the back surface B side.

FIG. 4(B) is a schematic cross-sectional view of the hologram recording medium 1 including the second hologram recording layer 41 as the information layer 12, and further including a second wavelength selecting reflection layer 43, and a second beam absorbing layer 44, and a second information layer 45. The second wavelength selecting reflection layer 43 reflects the second wavelength beam 3 and transmits a third wavelength beam 4. The second beam absorbing layer 44 absorbs the second wavelength beam 3. Information is recorded onto or reproduced from the second information layer 45 by the third wavelength beam 4. In FIG. 4(B), the first hologram recording layer 15 and the second hologram recording layer 41 are preferably formed from a material that is not sensitive to the third wavelength beam 4. The first wavelength selecting reflection layer 14 reflects the first wavelength beam 2 and transmits the second wavelength beam 3 and the third wavelength beam 4.

The protecting layer 16 is formed on the front surface of the recording medium 1 on the entrance surface A side and protects the recording medium 1. The protecting layer 16 is formed by a resin material, such as an ultra-violet (UV) resin, being applied onto the wavelength selecting reflection layer 14 by spin-coating or the like, or a resin sheet, such as a polycarbonate sheet, being adhered.

Furthermore, the recording medium 1 can include a gap layer between the hologram recording layer 15 and the wavelength selecting reflection layer 14. The gap layer is formed by a resin material, such as an ultra-violet (UV) resin, being applied onto the wavelength selecting reflection layer 14 by spin-coating or the like, or a resin sheet, such as a polycarbonate sheet, being adhered. The gap layer is effective for protecting the recording medium 1 and adjusting a size of a hologram generated within the hologram recording layer 15. In other words, when an interference area of the recording reference beam and the information beam in the hologram recording layer 15 is required to be formed to a certain size, it is effective to provide a gap between the hologram recording layer 15 and the servo pit.

In particular, it is effective when the object wave and the reference wave 2 are irradiated onto the recording medium 1 as converged light by an object lens 51, as shown in FIG. 5. In FIG. 5(A) in which the gap layer is not provided, a focal point 52 of the object wave and the reference wave 2 is focused on the wavelength selecting reflection layer 14 directly provided under the hologram recording layer 15, by the object lens 51. Therefore, a large amount of photosensitive material of the hologram recording layer 15 is consumed by a section near the focal point at which an interference pattern 53 is concentrated. Therefore, multiplicity (an amount by which the hologram can be multiple-recorded at a same location) of the hologram recording layer 15 decreases. Moreover, the concentrated interference pattern 53 becomes noise of the overlapped holograms.

As shown in FIG. 5(B), when the gap layer 54 is provided between the hologram recording layer 15 and the wavelength selecting reflection layer 14, the section near the focal point at which the interference pattern is concentrated is positioned in the gap layer 54. Therefore, the decrease in the multiplicity of the hologram recording layer 15 can be reduced. A thickness of the gap layer is preferably within a range of 10 to 100 micrometers.

As a manufacturing method of the hologram recording medium 1 shown in FIG. 1 to FIG. 5, the layers can be stacked from the layer closest to the substrate 11 to the protecting layer 16. Alternatively, the protecting layer 16 can be used as a substrate, and the layers can be stacked sequentially from the protecting layer 16. Alternatively, the substrate 11 on which some layers are stacked can be adhered to the protecting layer 1 on which the remaining layers are stacked. In particular, in the method in which the substrate 11 and the protective layer 16 are adhered, manufacturing procedures can be omitted by a layer, such as the gap layer, serving as the adhesive layer. As described above, when the wavelength selecting reflection layer 14 is formed by the coating method, the manufacturing costs can be significantly reduced.

The information beam and the recording reference beam are irradiated during recording, and the reproducing reference beam is irradiated during reproduction onto the hologram recording medium 1 of the present invention as the first wavelength beam 2. The first wavelength beam 2 passes through the protecting layer 16 of the hologram recording medium 1 and forms the interference pattern in the hologram recording layer 15. The first wavelength beam 2 also interferes with the interference pattern and generates a first wavelength reproduction beam. Subsequently, the first wavelength beam and the reproduction beam are reflected by the wavelength selecting reflection layer 14, once again pass through the hologram recording layer 15 and the protecting layer 16, and are emitted from the entrance surface A of the recording medium 1.

Even if the first wavelength beam and the reproduction beam pass through the wavelength selecting reflection layer 14, the first wavelength beam and the reproduction beam are absorbed by the beam absorbing layer 13. Therefore, the first wavelength beam and the reproduction beam are not scattered by the information layer 12. Even if a portion of the first wavelength beam and the reproduction beam reaches the information layer 12 and is scattered, the scattered light is also absorbed by the beam absorbing layer 13. Therefore, the first wavelength beam and the reproduction beam that passes through the wavelength selecting reflection layer 14 rarely scatter and enter the hologram recording layer 15.

On the other hand, the second wavelength beam 3 passes through the protecting layer 16, the hologram recording layer 15, the wavelength selecting reflection layer 14, and the beam absorbing layer 13, and records or reproduces information at the information layer 12. If the information layer 12 is a reflective-type, the second wavelength beam 3 once again passes through the beam absorbing layer 13, the wavelength selecting reflection layer 14, the hologram recording layer 15, and the protecting layer 16 and is emitted from the entrance surface A of the recording medium 1. If the information layer 12 is a transmissive-type, the second wavelength beam 3 passes through the substrate 11 and is emitted from the back surface B of the recording medium 1.

EXAMPLE 1

Figure 6:
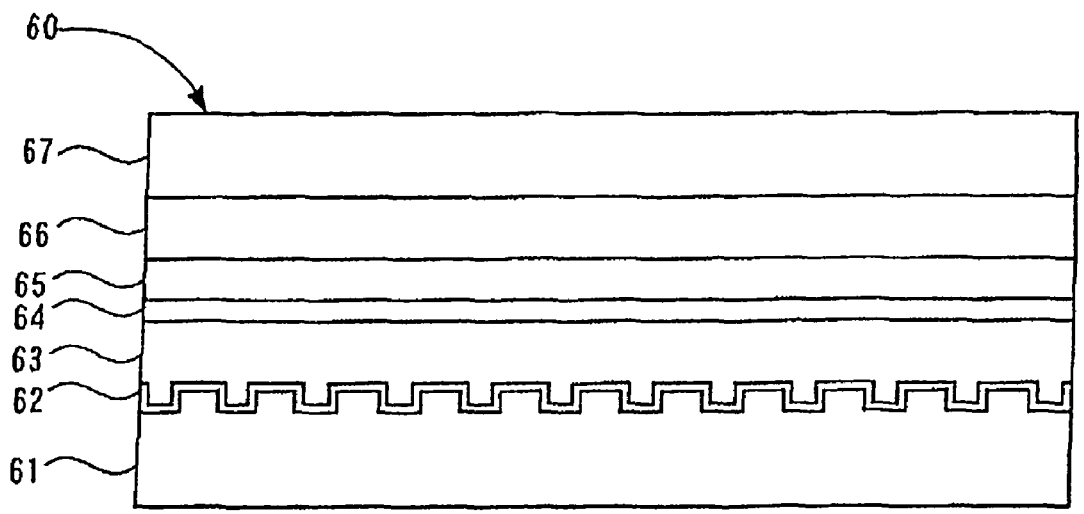
FIG. 6 is a schematic cross-sectional view of an example of a hologram recording medium of the present invention.
Figure 7:
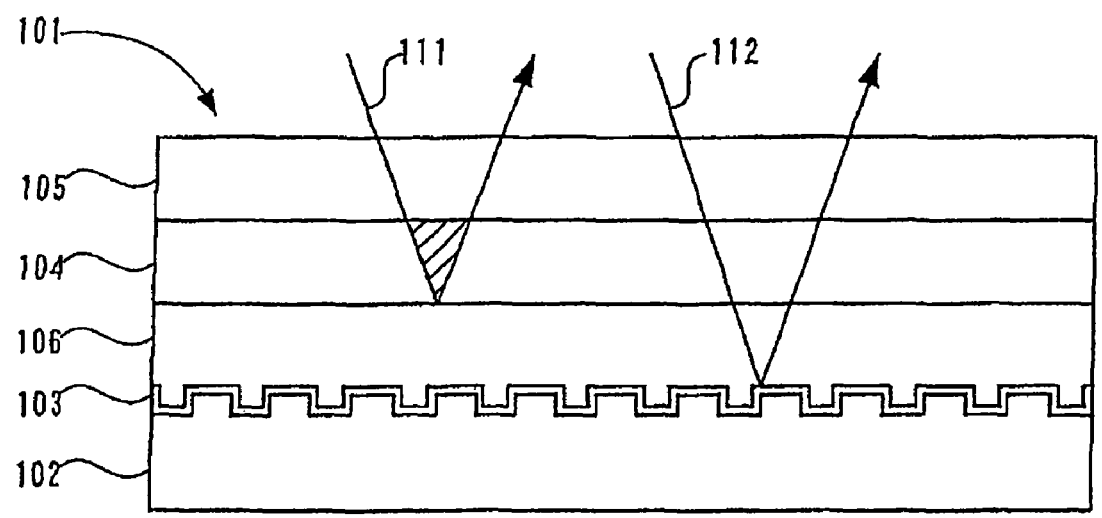
FIG. 7 is a schematic cross-sectional view of a conventional hologram recording medium.

FIG. 6 is a schematic cross-sectional view of a hologram recording medium 60. In the example, a green beam with a wavelength of 532 nanometers is used as the first wavelength beam. A red beam having a wavelength of 650 nanometers is used as the second wavelength beam.

Polycarbonate is used as the substrate 61. Concave and convex shapes are formed on the front surface by an injection-molding process. Servo information and identifying information of the recording medium are recorded as pits. Furthermore, an aluminum film coating the concave and convex shapes of the substrate 61 is formed by sputter deposition method, and a reflection layer 62 serving as the information layer is formed.

A resin filter of 100 micrometers is formed on the reflection layer 62 by an adhering method, to serve as a beam absorbing layer 63. An absorption rate of the beam absorbing layer 63 for the green beam having the wavelength of 532 nanometers is about 0.9.

A cholesteric liquid crystal layer of a predetermined thickness, such as 1 to 100 micrometers, is formed on the beam absorbing layer 63 by a coating method, to serve as a wavelength selecting reflection layer 64. A reflectance of the wavelength selecting reflection layer 64 for the green beam having the wavelength of 532 nanometers is about 0.9. A transmittance for the red beam having the wavelength of 650 nanometers is 0.7.

A UV resin of 30 micrometers is formed on the wavelength selecting reflection layer 64 by spin coating, to serve as a gap layer 65.

A photopolymer is sandwiched between the substrate 61, on to which layers up to the gap layer 65 are formed, and a polycarbonate substrate functioning as the protecting layer 67, thereby forming a hologram recording layer 66. The hologram recording layer 66 is sensitive to the green beam having the wavelength of 532 nanometers, but is not sensitive to the red beam having the wavelength of 650 nanometers.

The polycarbonate substrate on the hologram recording layer 66 becomes the protecting layer 67 and has a thickness of 600 micrometers.

The green beam having the wavelength of 532 nanometers and the red beam having the wavelength of 650 nanometers is irradiated onto the hologram recording medium to record or reproduce information.

When recording, the information beam and the recording reference beam are irradiated onto the hologram recording medium 61 as the green beam. The information beam and the recording reference beam pass through the protecting layer 67. The interference pattern of the information beam and the recording reference beam is recorded in the hologram recording layer 66. Then, the information beam and the recording reference beam pass through the gap layer 65 and are reflected by the wavelength selecting reflection layer 64. The information beam and the recording reference beam once again pass through the hologram recording layer 66 and are emitted outside of the hologram recording medium 61, via the protecting layer 67. The reflectance of the wavelength selecting reflection layer 64 for the green beam is about 0.9. Therefore, a portion of the green beam (beam of about 0.1) may pass through the wavelength selecting reflection layer 64. However, the absorption rate of the beam absorbing layer 63 for the green beam is about 0.9. Therefore, about 90 percent of the portion of the green beam (beam of about 0.1) is absorbed before the portion of the green beam reaches the reflection layer 62. Moreover, 90 percent of the portion of the green beam that reaches the reflection layer 62 and is reflected is absorbed before the portion of the green beam reaches the wavelength selecting reflection layer 64. Ninety percent of the portion of the green beam is reflected by the wavelength selecting reflection layer 64. Therefore, even if the portion of the green beam (beam of about 0.1) passes through the wavelength selecting reflection layer 64, very little of the green beam returns.

When reproducing, the reproducing reference beam is irradiated onto the hologram recording medium 61 as the green beam. The reproducing reference beam passes through the protecting layer 67 and generates the reproduction beam from the interference pattern recorded in the hologram recording layer 66. The reproducing reference beam and the reproduction beam then pass through the gap layer 65 and are reflected by the wavelength selecting reflection layer 64. The reproducing reference beam and the reproduction beam once again passes through the hologram recording layer 66 and are emitted outside of the hologram recording medium 61, via the protecting layer 67. Even if a portion of the reproducing reference beam and the reproduction beam passes through the wavelength selecting reflection layer 64, as described in the explanation for when recording is performed, the portion of the reproducing reference beam and the reproduction beam is absorbed by the beam absorbing layer 63. The reproduction beam emitted outside of the hologram recording medium 61 is detected by a light detector. Information held by the information beam is reproduced.

The red beam passes through the protecting layer 67, the hologram recording layer 66, the gap layer 65, the wavelength selecting reflection layer 64, and the beam absorbing layer 63. The red beam is reflected by the reflection layer 62 and is emitted outside of the hologram recording medium 61, via the beam absorbing layer 63, the wavelength selecting reflection layer 64, the gap layer 65, the hologram recording layer 66, and the protecting layer 67. The red beam that is emitted outside of the hologram recording medium 61 is detected by the light detector. Information in the pits formed on the reflection layer 62 is reproduced. Servo information or identifying information of the recorded medium is read.

The identifying information of the recording medium read by the red beam specifies a recording capacity, structure, and the like of the recording medium. The identifying information is used when setting is performed for encoding and decoding green beam irradiating conditions and information required for recording or reproducing information, and the like. The servo information read by the red beam is used to specify the irradiation position of the green beam. The reproduction of the servo information by the red beam is preferably continued during the recording or reproduction of information by the green beam because the irradiating position of the green beam can be accurately positioned. In particular, when the recording or reproduction of information by the green beam is performed while the recording medium is being moved, the irradiating position of the green beam becomes easily misaligned. Therefore, the reproduction of the servo information by the red beam is preferably performed continuously.

The present invention is not limited to the above-described embodiment. Various modifications can be made as required. For example, optical paths for recording and for reproducing information are shared according to the embodiment. However, the present invention can be similarly applied when the optical paths are separated.

The invention claimed is:

1. A hologram recording medium comprising:
   a substrate;
   a hologram recording layer that records an interference pattern formed by a first wavelength beam;
   a wave selecting reflection layer provided between the substrate and the hologram recording layer that reflects the first wavelength beam and transmits a second wavelength beam;
   a beam absorbing layer provided between the substrate and the wavelength selecting reflection layer that absorbs the first wavelength beam;
   an information layer provided between the substrate and the beam absorbing layer in which information is recorded or reproduced by the second wavelength beam;
   a second information layer provided between the substrate and the information layer; and
   a second wavelength selecting reflection layer provided between the information layer and the second information layer that reflects the second wavelength beam and transmits a third wavelength beam.

2. The hologram recording medium according to claim 1, wherein an absorption rate of the beam absorbing layer for the first wavelength beam is 0.9 or more.

3. The hologram recording medium according to claim 1 or 2, wherein a reflectance of the wavelength selecting reflection layer for the first wavelength beam is 0.9 or more.

4. The hologram recording medium according to claim 1 or 2, comprising a gap layer provided between the hologram recording layer and the wavelength selecting reflection layer.

5. The hologram recording medium according to claim 1 or 2, wherein information is recorded in the information layer by pits.

* * * * *